United States Patent [19]

Pham

[11] 4,391,435

[45] Jul. 5, 1983

[54] SUSPENSION DEVICE

[75] Inventor: Anh T. Pham, Elancourt, France

[73] Assignee: Chrysler France, France

[21] Appl. No.: 236,295

[22] Filed: Feb. 19, 1981

Related U.S. Application Data

[63] Continuation-in-part of Ser. No. 53,305, Jun. 29, 1979, abandoned.

[30] Foreign Application Priority Data

Jul. 3, 1978 [FR] France ................................ 78 19797
May 23, 1979 [FR] France ................................ 79 13128

[51] Int. Cl.³ .......................... F16F 1/54; F16F 13/00
[52] U.S. Cl. .................................. 267/140.1; 188/298;
248/562; 248/636; 280/710
[58] Field of Search ...................... 188/298; 267/140.1,
267/141, 141.2, 141.3, 141.4, 141.5, 141.6,
141.7, 35, 8 R, 63 A, 118; 248/562, 636;
280/710, 712

[56] References Cited

U.S. PATENT DOCUMENTS

| | | | |
|---|---|---|---|
| 2,317,028 | 4/1943 | Chappell et al. | 188/298 X |
| 2,380,899 | 7/1945 | Strachovsky | 267/140.1 |
| 2,387,066 | 10/1945 | Harding | 188/298 X |
| 2,457,749 | 12/1948 | Thiry | 267/140.1 |
| 2,822,164 | 2/1958 | Boschi | 267/8 R |
| 2,919,883 | 1/1960 | Murphy | 267/140.1 |
| 3,368,807 | 2/1968 | Thrasher | 267/35 |
| 3,730,104 | 5/1973 | Hood | 267/118 X |
| 4,159,091 | 6/1979 | Le Salver et al. | 248/562 |
| 4,288,063 | 9/1981 | Brenner et al. | 267/140.1 |

FOREIGN PATENT DOCUMENTS

| | | | |
|---|---|---|---|
| 183609 | 10/1955 | Fed. Rep. of Germany | 267/35 |
| 1480229 | 6/1970 | Fed. Rep. of Germany | 188/298 |
| 642711 | 5/1928 | France | 188/298 |
| 62894 | 2/1955 | France | 188/298 |

Primary Examiner—George E. A. Halvosa
Attorney, Agent, or Firm—Steinberg & Raskin

[57] ABSTRACT

The present invention relates to a device for mounting a carried element on a carrying element in an automotive vehicle or the like. The device comprises a resiliently deformable support secured to two frame members so as to define a fluid-tight chamber, the chamber containing a fluid and being divided into two portions by a separating partition formed of a resilient annular portion affixed to one frame member and which carries a block member having at least one orifice through which the fluid is adapted to pass from one chamber portion to the other. The block member has a certain inertial mass such that the resilient portion will oscillate substantially following the displacement of the carried element when the latter vibrates at a frequency less than a particular frequency but will oscillate independently of the displacement of the carried element when the latter vibrates at a frequency greater than the particular frequency. In this manner, the fluid flow pattern through the orifice during high frequency vibrations is inverted relative to normal conditions thereby reducing vibration damping and reducing noise.

2 Claims, 5 Drawing Figures

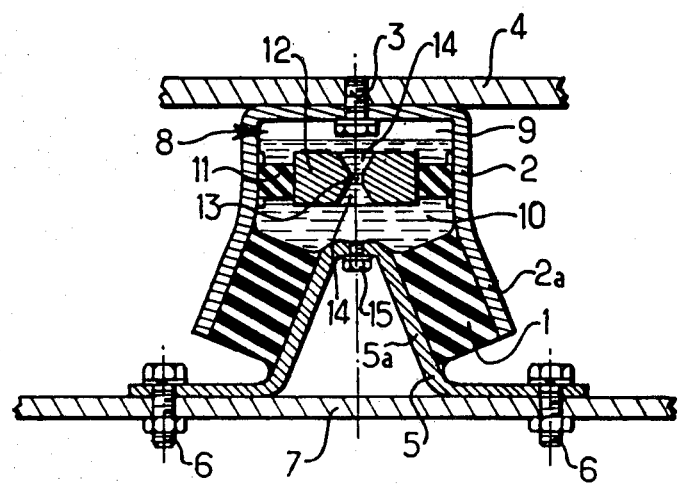
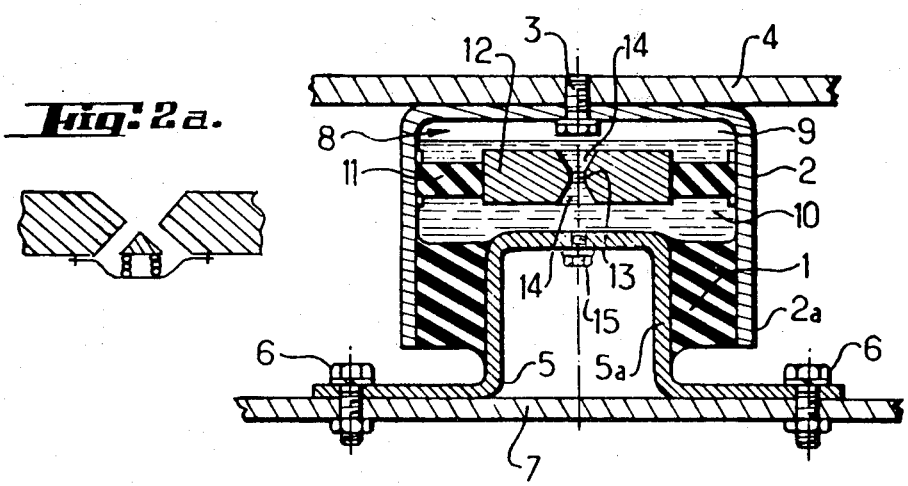

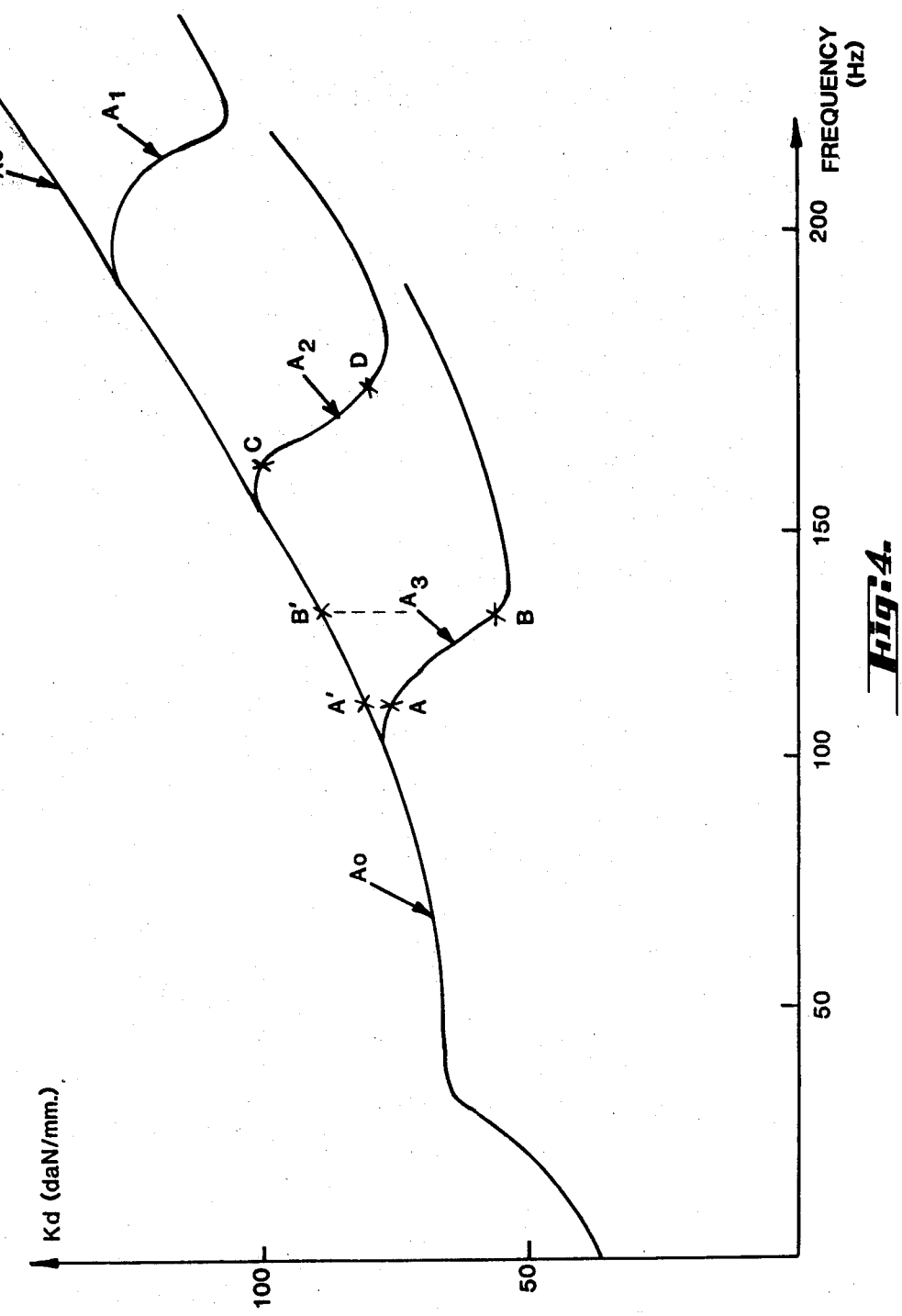

SUSPENSION DEVICE

BACKGROUND OF THE INVENTION

This application is a continuation-in-part of application Ser. No. 53,305 filed June 29, 1979, now abandoned.

The present invention relates to a suspension device intended to be mounted between two elements, at least one of which may be relatively movable with respect to the other under various exciting actions.

An example of use of a device according to the invention is found in the suspension of the engine or of other mechanical members from the chassis of an automotive vehicle.

In such an application, an adequate suspension device must meet several conflicting requirements.

In the first place, in the low-frequency range, i.e., about 10 cps, the inherent or natural frequencies of the suspended engine must be notably different from the inherent or natural frequencies of the front-end or rear-end suspension systems of the vehicle to avoid couplings leading to poor road behavior, on the one hand, and causing discomfort, on the other.

Furthermore, the engine suspension must provide an important damping effect in the low-frequency range in order to avoid engine vibration when the vehicle runs on a bad road.

Also, in the high-frequency range, i.e. between substantially 100 and 200 cps, the engine suspension must not transmit excessive vibration which would generate a high level of noise.

It has been found that by using rubber blocks that are simply adhesively secured on metal frame members, two kinds of results can be obtained:

if the engine suspension is stiff, reduced vibration will result, but on the other hand significant noise will be transmitted at high engine speeds;

if, on the other hand, the suspension is flexible, reduced noise will be transmitted at high frequencies, but significant vibration will be produced at low frequencies.

Suspension devices for vehicle engines are known which utilize supports of rubber or like material defining a chamber whose internal volume is separated into two portions by a flexible partition provided with a calibrated orifice, and which contains a liquid whose flow between the two chamber portions through the orifice ensures damping at low frequencies. Such devices also allow high-frequency vibration to be attenuated to a certain extent by the local deformations of the separating partition.

Also known are devices wherein the flexible partition includes a thin disc or plate in which an orifice is provided, the disc being attached to a resilient portion. Two types of such devices are illustrated in U.S. Pat. Nos. 2,387,066 issued to Harding and 4,159,091 issued to Le Salver et al. Such discs have a mass which is relatively negligible as compared to the resilient portion and have no effect on the vibratory characteristics of the flexible partition. The discs are provided in such devices generally in order to allow a pressure differential to exist between the chamber portions on either side of the flexible partition. As such, the flexible partition will not vibrate inpendently of the device to which it is attached.

However, the applicant has found that damping at high frequencies was far from being satisfactory with the devices of the prior art.

SUMMARY OF THE INVENTION

The present invention has essentially for its object to remedy the drawback mentioned above by providing a new suspension device which not only provides adequate damping at low frequencies, but whose damping effect is considerably improved at high frequencies, thus preventing noise from propagating and being transmitted by the vehicle body.

With this end in view, the invention is directed to a device for mounting a carried element on a carrying element and comprising a first frame member affixed to the carried element, a second frame member affixed to the carrying element, at least one resiliently deformable support, e.g. of rubber, arranged between the members so as to define a fluid-tight chamber, the chamber containing an incompressible fluid and being divided into two portions by a separating partition formed of a resilient or flexible portion affixed to one of the frame members and carrying a block member provided with at least one orifice through which the fluid is adapted to pass from one chamber portion to the other chamber portion, the device being essentially characterized in that the block has a certain substantial inertial mass such that although the resilient portion will oscillate substantially following the displacement of the carried element when the carried element vibrates at a frequency less than a particular frequency, when the carried element vibrates at a frequency greater than that particular frequency, the resilient portion will oscillate differently from the displacement. Thus, at high frequencies the partition vibrates on its own in the manner of a spring with the block member constituting a weight affixed thereto. The pattern of fluid flow through the orifice at high frequencies is substantially inverted relative to the normal fluid flow pattern which occurs at lower frequencies.

According to the invention and as will be described later, it is precisely the inertia weight of the block member that provides a reduction of the damping which would exist at high frequency with a partition deprived of the inertia weight of the block member.

It will also be added that the inertia weight of the block member will be a quite definite value depending on the rigidity of the separating partition.

According to another characterizing feature of the invention, a deformable cover is secured on the block to close the fluid-tight chamber and isolate the fluid from the surrounding medium.

In this embodiment, the block member forms a part of a block assembly which includes a tubular member fixed within the block member which projects beyond the lower surface thereof. The tubular member is provided at one of its ends with the aforesaid orifice and serves as a support for the block member by the said resilient partition.

According to still another characterizing feature of the invention, the extent of the movement of the block member is fixed by shims or the like interposed on either side of the resilient partition, and the movement of the block member is further limited by a peripheral ring attached to one of the said elements and on which is mounted or adhesively secured the said resilient partition.

The frame members preferably comprise cylindrical or conical members and are situated substantially coaxially relative to each other so that one of them at least partially surrounds the other one of the frame members. The deformable support is affixed to the portions of the frame members which overlap each other.

There may also be provided valves or the like, e.g. of the spring-loaded type, which are associated with the orifice provided in the block.

The invention is also directed to automotive vehicles equipped with at least one suspension device having the abovementioned characterizing features.

DESCRIPTION OF THE DRAWINGS

Other characterizing features and advantages of the invention will appear more clearly from the following detailed description made with reference to the appended drawings given solely by way of example and wherein:

FIG. 1 is an axial sectional view of a suspension or damping device according to the principles of the invention;

FIG. 2 is an axial sectional view of a second form of embodiment of the suspension device;

FIG. 2a is a detail view of an embodiment of the device similar to the one illustrated in FIG. 2, and showing valve structure which may be incorporated therein;

FIG. 4 is a graphical view illustrating typical experimental results obtained with three embodiments of the invention and a conventional device, the graph being a plot of dynamic rigidity of the device against frequency of vibration of the carried element.

DESCRIPTION OF THE PREFERRED EMBODIMENTS

Figure 3:
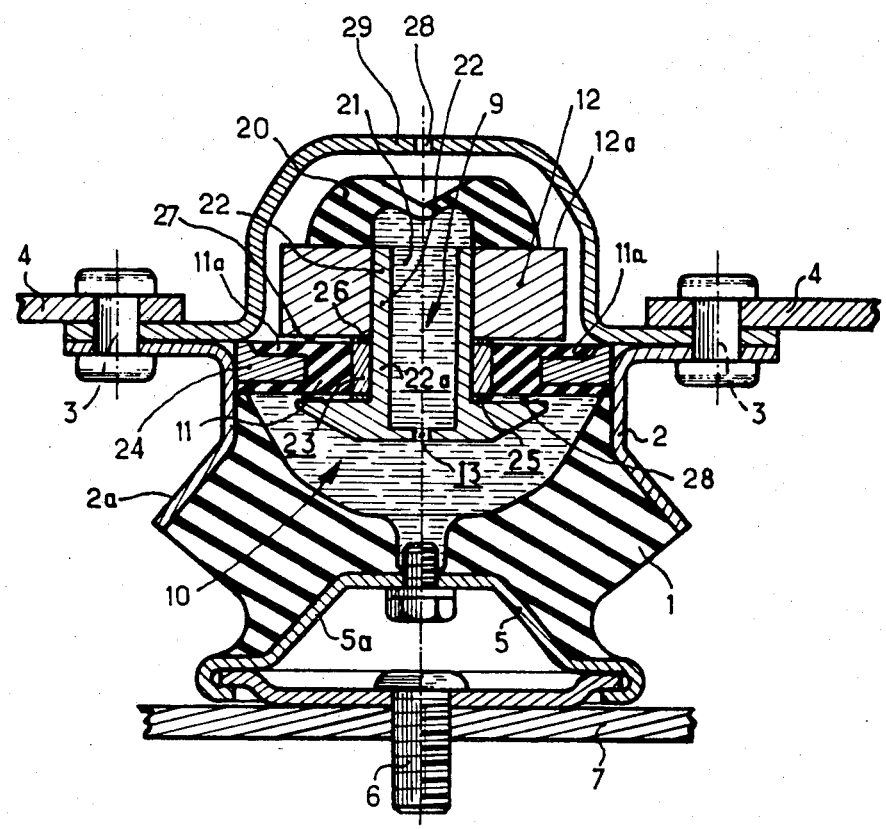
FIG. 3 is an axial sectional view of still another form of embodiment of the suspension device.

Referring to the appended drawings, a suspension device according to the invention comprises essentially a resiliently deformable support 1, e.g. of rubber, adhesively secured between an upper frame member 2 attached at 3 to a carried element 4, such as for example an automotive vehicle engine, and a lower frame member 5 attached at 6 to a carrying element, such as for example the vehicle body.

As seen in FIGS. 1 and 2, the frame members 2 and 5 together with the resilient support 1 define a fluid-tight volume 8 containing a fluid, e.g. a water—antifreeze—based liquid.

The chamber 8 is divided into an upper chamber portion 9 and a lower chamber portion 10 by a separating partition composed of a flexible and resilient annular portion 11 adhesively secured to the upper frame member 2 and carrying preferably in its central portion a block 12 adhesively secured thereto, of a material providing a certain inertia weight of an adquate value depending on the desired results and taking into account the rigidity of the partition 11. Otherwise stated, the block 12 is suspended from the partition 11 which will act as a spring as will be explained in detail later in connection with the operation of the device.

The block or inertia weight 12 is provided in its central portion, according to the example of embodiment of FIGS. 1 and 2, with a calibrated orifice 13 opening into the upper and lower chambers 9 and 10 through the medium of two substantially conical and mutually opposite hollows 14 provided in the block 12 on either side of the orifice 13.

At 15 is shown a stopper, plug or the like allowing the chambers 9 and 10 to be partially filled with liquid.

According to the embodiment illustrated in FIGS. 1 and 3, the frame members 2 and 5 are substantially conical in shape, with substantially corresponding portions 2a and 5a, so that, the upper frame member 2 coaxially embracing or surrounding the lower frame member 5, the resiliently deformable support 1 is adhesively secured to the said portions 2a and 5a, as seen clearly in FIGS. 1 and 3.

The form of embodiment illustrated in FIG. 2 employs the same principle as the one set forth in the foregoing, so that the same reference numerals are used. In this case, however, it is seen that both the upper frame member 2 and lower frame member 5 surrounded by frame member 2 are substantially cylindrical in shape. The resiliently deformable support 1 is adhesively secured at the level of the corresponding vertical portions 2a and 5a of the frame members 2 and 5, respectively.

There may advantageously be provided valves or the like (FIG. 2a), e.g. of the spring-loaded type, associated with the calibrated orifice 13 in order, for example, to regulate the flow of liquid passing through the orifice between the two chambers 9 and 10.

According to the form of embodiment illustrated in FIG. 3, a deformable cover 20 is attached, e.g. adhesively secured, to the upper surface 12a of the block 12 supported by the resilient annular partition 11. The cover 20, the block 12, the separating partition 11 and the resilient support 1 thus define the upper chamber 9 and the lower chamber 10. In this form of embodiment, however, it is seen that the deformable cover 20 closes the upper chamber 9 so as, in this way, to isolate the fluid from the surrounding medium.

According to the form of embodiment illustrated in FIG. 3, a tubular member 22 is fixed in an opening 21 of the block 12 and projects beyond the lower surface of the latter. The member 22 is provided at one of its ends with the aforementioned orifice 13 and serves as a support for the block 12 by the resilient partition 11.

More precisely, the partition 11 is attached to the portion 22a of the member 22 through the medium of an inner ring 23 and is also attached to the upper frame member 2 through the medium of an outer or peripheral ring 24, which also performs the function of limiting the movement of the inertia weight 12, as will be explained hereafter.

As shown in FIG. 3, shims 25 and 26 or the like are interposed on either side of the resilient partition 11. The tubular member 22 is to be considered as being an integral part of the block 12 to form a block assembly therewith. A hood member 29 protects the damping device of FIG. 3, which hood member is provided with an orifice 28 for connection with the open air.

The operation and advantages of the suspension device illustrated in FIGS. 1 to 3 are as follows:

In the first place, as regards low-frequency vibration, the latter results in a relative movement of the upper frame member 2 with respect to the lower frame member 5 and therefore produces a variation in the volume of the lower chamber portion 10, thus compelling the liquid to pass alternately from one chamber portion into the other through the calibrated orifice 13. Of course the rigidity of the resilient portion 11 of the separating partition must be sufficient to allow the device to provide some damping. It has been found that, at low frequencies, the device according to the invention provides a much better damping than the one obtained with the devices of the prior art constituted only by adhesively secured resilient supports of rubber or the like.

As regards the high-frequency vibration which produces noise and, as seen earlier, is comprised within a quite definite frequency range, it also causes the liquid to move alternately through the calibrated orifice 13. But this is where the resilient separating partition carrying, according to the invention, the block or inertia weight 12 fulfills its function as a spring. Indeed, owing to this block having a certain inertial weight, the partition separating the two chambers 9 and 10 no longer becomes deformed simply by following the displacement of the upper frame member 2, but with a certain lag or phase shift producing through the calibrated orifice 13 a flow of liquid that is inverted with respect to the one noted at low frequency.

More precisely, the displacement of the block 12 takes place in the opposite direction to that of the frame member 2 attached to the carried element 4, thus resulting in a substantial increase in pressure in the chamber portion 9 above the separating partition. Thus, the reaction forces of the element 4, i.e. the forces that are transmitted at the higher frequencies, are considerably reduced.

Briefly, in the presence of low-frequency vibration, the movements of the separating partition with the block 12 coincide with those of the upper frame member 2, whereas in the presence of high-frequency vibration, the movements of the separating partition, owing to the block 12, differ from those of the said frame member, thus allowing noise transmission to be considerably reduced.

It will also be added here that the resiliently deformable supports 1, in addition to their sealing function, advantageously fulfill the function of springs.

A graphical depiction of experimental results obtained with three embodiments of the invention and a conventional device is illustrated in FIG. 4. In this graph, the dynamic rigidity $K_d$ of the device (decanewtons/millimeter) is plotted against the frequency (Hertz) of vibration of a carried element. e.g. element 4 in FIG. 1. The dynamic rigidity $K_d$ is the ratio of the force transmitted by the carried element to the displacement of the same.

The curve designated $A_o$ corresponds to the operation of a device including a partition formed of a flexible or resilient portion and a central disc having a mass which is relatively insignificant relative to the mass of the resilient portion, such as that illustrated in U.S. Pat. Nos. 2,387,066 (Harding) and 4,159,091 (Le Salver et al.).

The curves designated $A_1$, $A_2$ and $A_3$ correspond to the operation of three devices constructed, by way of example, according to the present invention, the flexible partitions in each case having the same rigidity and a mass of about 50 grams and the block members having masses of about 100 grams, 200 grams and 300 grams, respectively.

It is clearly seen that for each of the three devices of the present invention, there exists a particular frequency of vibration beyond which a lag followed by a decrease of the transmitted force and dynamic rigidity occurs. For example, referring to curve $A_3$ which illustrates the operation of a device wherein the block has a mass of 300 grams (with the flexible portion having a mass of 50 grams), it is seen that the dynamic rigidity of the device abruptly decreases when the frequency of vibration of the carried element exceeds about 120 Hz.

This operation provides a significant advantage relative to that of conventional devices represented by curve $A_o$. More particularly, when the carried element vibrates at high frequencies, such as 120 Hz and above, the damping device should preferably be less rigid or stiff relative to conventional devices represented by curve $A_o$ in order to function efficiently. This object is obtained by the present invention as clearly illustrated by FIG. 4. Thus, the device should be supple or flexible when operating at high frequencies but be hard or stiff at lower frequencies in order to be efficient. The device of the present invention satisfies these requirements.

Comparing curves $A_o$ and $A_3$, it can be said that the partition behaves like a spring whose movements do not follow those movements of the carried element and so provide a reduction of Kd, when the frequency of vibration of the carried element increases beyond a particular frequency (see curve portion AB of curve $A_3$). The opposite result is obtained with conventional devices (see curve portion A' B' of curve $A_o$). This operation is due to the substantial inertial mass of block 12 (e.g. 300 grams) which provides the resilient portion of the partition with a particular vibration which is phase-shifted with respect to the carried element 4. This phase-shift provides a lag which results in an inversion of the fluid flow through the orifice, i.e., an inverse pumping effect, which diminishes the forces transmitted by the carried element thereby reducing the noise generated at high frequencies.

It is noted that the particular frequency at which the partition will begin to vibrate independently of the carried element can be varied as desired by providing the block 12 with a suitable inertial mass. For example, by providing the block with a mass of 200 grams, the frequency at which independent vibration will be initiated is reduced to 175 Hz (curve $A_2$).

Of course, the particular mass of the inertia block 12 and all of the eventual parts associated and integral therewith, such as cover 20, tubular member 22, inner ring 23 and shims 25 and 26 shown in FIG. 3 will depend on many factors including the dimensions of the device, the nature of the fluid, the flexibility of the resilient portion, etc. However, it is preferable for the mass of the block carried by the resilient portion to be in the range of about 2 to 30 times greater than the mass of the resilient portion, and good results have been obtained where the mass of the block is six times that of the resilient portion.

As regards the operation of the form of embodiment of FIG. 3, the following additional details should be noted.

The shims 25 and 26 provide a clearance or play between the block and the partition 11, as shown at 27 and 28, thus allowing free movement of the block 12 in the axial direction of the device relative to the peripheral ring 24, to a value substantially equal to the thickness of the shims 25 and 26. A movement of greater amplitude of the movable weight 12 will be limited by an abutment contact of the block with the portion 11a of the partition 11, located between the said weight and the peripheral ring 24. Thus the portion 11a of partition 11 acts as a resilient abutment means for the block 12 during its various motions or deflections.

Consequently, the deformable cover 20 which serves as a closing means for the fluid-tight chambers 9 and 10 allows the damping fluid to be isolated from the exterior medium and, as a result of its resiliency, it allows the variations in volume of the said fluid to be compensated for as the latter alternately passes from the chamber 9 into the chamber 10 and vice versa through the orifice 13.

Of course the invention is by no means limited to the forms of embodiment described and illustrated which have been given by way of example only. Thus, the block 12 may be made from any suitable material and the frame members 2 and 5 may be given any appropriate configuration without departing from the scope of the invention. Also, it should be noted here that the expressions "block" and "block member" used in the specification and claims should be understood as embodying a simple block as seen in FIGS. 1, 2 and 2a or a "composite" block including some associated parts as seen in FIG. 3. The invention therefore comprises all technical means equivalent to the means described as well as their combinations should the latter be carried out according to its gist and used within the scope of the following claims.

What is claimed is:

1. In a device for mounting a carried element on a carrying element in an automotive vehicle or the like and comprising a first frame member affixed to said carried element, a second frame member affixed to said carrying element, at least one resiliently deformable support arranged between said members so as to define a fluid-tight chamber with said frame members, said chamber containing an incompressible fluid and being divided into two portions by a separating partition formed of a resilient portion affixed to said first frame member and carrying a block member immersed in said fluid which is provided with at least one orifice through which the fluid is adapted to pass from one chamber portion of the other chamber portion, the improvements comprising: said block member carried by said resilient portion has a certain substantial inertial mass such that said block member constitutes means for causing said resilient portion to oscillate substantially following the displacement of said carried element when said carried element vibrates at a frequency less than a particular frequency resulting in a first normal fluid flow pattern through said orifice between said chamber portions relative to the displacement of said carried element, and for causing said resilient portion to oscillate differently from the displacement of said carried element when said carried element vibrates at a frequency greater than said particular frequency resulting in a second fluid flow pattern through said orifice between said chamber portions relative to the displacement of said carried element which is substantially inverted relative to said first normal fluid flow pattern, and wherein a deformable cover is directly secured on said block member for movement therewith to sealingly close the fluid tight chamber and isolate the fluid from the surrounding medium, and wherein said block member forms a part of a block assembly which includes a tubular member which is affixed to said resilient partition so as to extend centrally therethrough so that end regions thereof project beyond the surface of said resilient portion, one end region of said tubular member having said orifice provided therein, said block member being affixed to an upper end region of said tubular member, whereby said block member is supported by said resilient portion through said tubular member.

2. The combination of claim 1 further including shims disposed at both side surfaces of said resilient portion thereby spacing said block member from said resilient portion, and a peripherally extending ring affixed to said first frame member, said resilient portion being affixed to said ring, whereby movement of said block member is limited by the dimensions of said shims and peripherally extending ring.

* * * * *